(12) United States Patent
Mason et al.

(10) Patent No.: US 9,026,038 B2
(45) Date of Patent: May 5, 2015

(54) APPARATUS AND METHOD FOR REPEATING COMMUNICATION MESSAGES IN RAIL VEHICLE SYSTEM

(75) Inventors: Gary William Mason, Rockledge, FL (US); Mark E. Smith, Temecula, CA (US)

(73) Assignee: General Electric Company, Schenectady, NY (US)

(*) Notice: Subject to any disclaimer, the term of this patent is extended or adjusted under 35 U.S.C. 154(b) by 296 days.

(21) Appl. No.: 13/505,711
(22) PCT Filed: Nov. 5, 2010
(86) PCT No.: PCT/US2010/055626
§ 371 (c)(1),
(2), (4) Date: Jul. 16, 2012
(87) PCT Pub. No.: WO2011/057075
PCT Pub. Date: May 12, 2011

(65) Prior Publication Data
US 2012/0276841 A1 Nov. 1, 2012

Related U.S. Application Data

(60) Provisional application No. 61/258,868, filed on Nov. 6, 2009.

(51) Int. Cl.
*H04B 7/14* (2006.01)
*H04B 7/155* (2006.01)
(Continued)

(52) U.S. Cl.
CPC ........ *H04B 7/15528* (2013.01); *B61L 15/0027* (2013.01); *H04B 7/2606* (2013.01)

(58) Field of Classification Search
CPC ... B61L 1/00; B61L 2003/00; B61L 2201/00; B61L 2205/00; B61L 15/0018; B61L 15/0036; B61L 15/0054; B61L 15/0063; B61L 15/0027; B61L 15/0081; H04B 7/15528; H04B 7/2606; H04B 7/01
USPC ......... 455/7, 11.1, 422.1, 69, 522, 67.11, 10, 455/9, 24; 370/315, 352, 229–236, 312; 709/206; 379/88.23; 701/1, 19, 20, 36, 701/70; 303/3, 16, 20, 7; 714/748, 799
See application file for complete search history.

(56) References Cited

U.S. PATENT DOCUMENTS 5,720,455 A 2/1998 Kull et al.
5,738,311 A 4/1998 Fernandez
(Continued)

FOREIGN PATENT DOCUMENTS

CN 1204933 A 1/1999
CN 1281320 A 1/2001
(Continued)

OTHER PUBLICATIONS

International Search Report and Written Opinion from corresponding PCTUS2010/055626 dated Apr. 11, 2011.
(Continued)

*Primary Examiner* — Tan Trinh
(74) *Attorney, Agent, or Firm* — GE Global Patent Operation; John A. Kramer

(57) ABSTRACT

A communication apparatus includes an operation module configured for communication with a wireless message repeater, e.g., a rail vehicle distributed power message repeater. The wireless message repeater is of the type having an antenna system, a receiver for receiving an incoming message, and a transmitter for transmitting a repeat message of the incoming message. The operation module is further configured to assess operation of the message repeater by comparing a feedback signal to the incoming message. The feedback signal may comprise part of a signal energy of the transmitted repeat message as received by the receiver. Alternatively or additionally, the operation module is further configured to assess operation of the message repeater by comparing at least one signal power associated with the transmitted repeat message to at least one threshold.

19 Claims, 6 Drawing Sheets

(51) Int. Cl.
   *B61L 15/00*    (2006.01)
   *H04B 7/26*     (2006.01)

(56) References Cited

U.S. PATENT DOCUMENTS

| | | | |
|---|---|---|---|
| 5,740,547 A | 4/1998 | Kull et al. | |
| 5,785,392 A | 7/1998 | Hart | |
| 5,813,635 A | 9/1998 | Fernandez | |
| 5,820,226 A | 10/1998 | Hart | |
| 5,833,325 A | 11/1998 | Hart | |
| 5,927,822 A | 7/1999 | Hart | |
| 5,934,764 A | 8/1999 | Dimsa et al. | |
| 5,950,967 A | 9/1999 | Montgomery | |
| 5,969,643 A | 10/1999 | Curtis | |
| 5,978,718 A | 11/1999 | Kull | |
| 5,986,577 A | 11/1999 | Bezos | |
| 5,986,579 A | 11/1999 | Halvorson | |
| 5,995,881 A | 11/1999 | Kull | |
| 6,037,868 A | 3/2000 | Oh et al. | |
| 6,114,974 A | 9/2000 | Halvorson | |
| 6,128,558 A | 10/2000 | Kernwein | |
| 6,163,089 A | 12/2000 | Kull | |
| 6,216,095 B1 | 4/2001 | Glista | |
| 6,275,165 B1 | 8/2001 | Bezos | |
| 6,322,025 B1 | 11/2001 | Colbert et al. | |
| 6,360,998 B1 | 3/2002 | Halvorson et al. | |
| 6,377,215 B1 | 4/2002 | Halvorson et al. | |
| 6,401,015 B1 * | 6/2002 | Stewart et al. | 701/19 |
| 6,782,044 B1 | 8/2004 | Wright et al. | |
| 7,164,368 B1 * | 1/2007 | Ireland | 341/34 |
| 7,416,262 B2 | 8/2008 | Ring | |
| 8,157,218 B2 | 4/2012 | Riley et al. | |
| 8,310,979 B2 * | 11/2012 | Mason et al. | 370/315 |
| 8,428,798 B2 | 4/2013 | Kull | |
| 8,626,058 B2 * | 1/2014 | Smith et al. | 455/7 |
| 2005/0121971 A1 | 6/2005 | Ring | |
| 2006/0085103 A1 * | 4/2006 | Smith et al. | 701/19 |
| 2006/0166618 A1 * | 7/2006 | Bakaimis | 455/11.1 |
| 2007/0191071 A1 | 8/2007 | Spampinato et al. | |
| 2008/0195265 A1 * | 8/2008 | Searle et al. | 701/19 |
| 2009/0216498 A1 * | 8/2009 | Seguin et al. | 702/189 |
| 2010/0058133 A1 * | 3/2010 | Lee | 714/748 |
| 2010/0074160 A1 * | 3/2010 | Mason et al. | 370/315 |
| 2010/0076714 A1 * | 3/2010 | Discenzo | 702/104 |
| 2010/0118988 A1 * | 5/2010 | Smith et al. | 375/259 |
| 2012/0264370 A1 * | 10/2012 | Smith et al. | 455/11.1 |
| 2014/0011442 A1 * | 1/2014 | Dussmann, Alfons | 455/10 |

FOREIGN PATENT DOCUMENTS

| | | |
|---|---|---|
| CN | 101068119 A | 11/2007 |
| CN | 201039169 Y | 3/2008 |
| EP | 1 071 160 A2 | 1/2001 |
| WO | WO9960735 A1 | 11/1999 |
| WO | 01/48945 A1 | 7/2001 |
| WO | 2009082311 A1 | 2/2009 |
| WO | WO2010039680 A1 | 4/2010 |
| ZA | 200101708 A | 8/2001 |

OTHER PUBLICATIONS

Unofficial English translation of Chinese Office Action issued in connection with corresponding CN Application No. 201080060854.9 on Mar. 18, 2014.

* cited by examiner

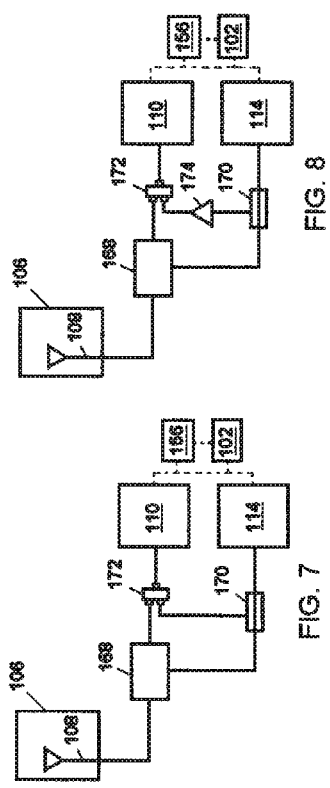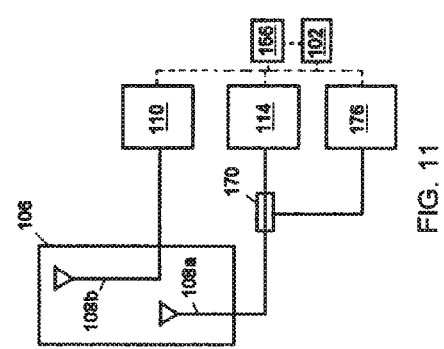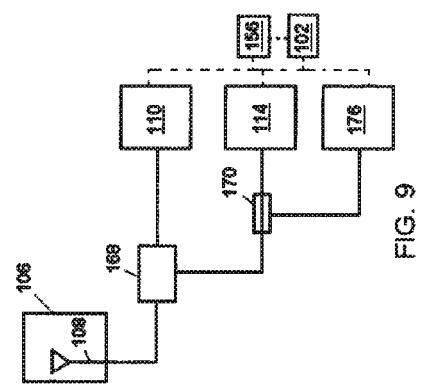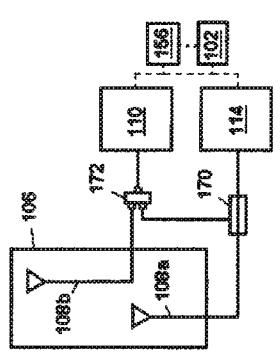

APPARATUS AND METHOD FOR REPEATING COMMUNICATION MESSAGES IN RAIL VEHICLE SYSTEM

CROSS-REFERENCE TO RELATED APPLICATIONS

This application is a U.S. National Phase of International Application No. PCT/US10/55626, filed Nov. 5, 2010, which claims priority to U.S. Provisional Application No. 61/258,868, filed Nov. 6, 2009.

FIELD OF THE INVENTION

Embodiments of this invention relate generally to communications. Other embodiments relate to communications in a rail vehicle system.

BACKGROUND OF THE INVENTION

A vehicle "consist" is a group of vehicles that are linked together to move together along a route. A common example is a train or other group of rail vehicles. Certain vehicle consists (e.g., a train comprising plural locomotives and plural freight cars or other railcars) utilize distributed power operations for improved control and handling of the vehicle consist. In the case of a train, for example, distributed power control involves one locomotive (e.g., a lead locomotive) transmitting commands to other locomotives (e.g., remote locomotives) in the train. The commands relate to throttle, braking, or other traction control-related operations. The remote or other locomotives receive the commands and respond thereto, effectuating a controlled and coordinated traction effort for the train as a whole.

Distributed power may involve wire-line communications (e.g., a cable extending between vehicles in a consist), wireless communications (referred to as "radio distributed power"), or both. In the case of wireless communications, each vehicle in a consist is outfitted with a receiver or transceiver for receiving and/or transmitting messages, or for otherwise communicating between vehicles. For distributed power, off-vehicle distributed power message repeaters are sometimes used to bolster a consist's on-board capability. That is, there may be times when a lead or other vehicle in a consist is unable to reliably wirelessly communicate with other vehicles in the consist, due to geographic features or otherwise. It may also be desirable to bolster a consist's on-board transmission capability, even if communications are not totally compromised, to improve communications reliability, for safety purposes, or the like.

Distributed power message repeaters are sometimes installed in very isolated and inaccessible locations. A failure of a message repeater can go undetected for a long period of time and may only become apparent when a radio distributed power train (or other vehicle consist) transiting the area is no longer able to access it. This can result in the train stalling or otherwise blocking that area of the line.

BRIEF DESCRIPTION

An embodiment of the invention relates to a communication apparatus, which includes an operation module configured for communication with a wireless message repeater (e.g., the operation module is electrically connectable to the wireless message repeater). The wireless message repeater is of the type having an antenna system, a receiver for receiving an incoming message, and a transmitter for transmitting a repeat message of the incoming message. ("Repeat message" means an at least partial copy of the incoming message.) The operation module is further configured to assess operation of the message repeater (e.g., whether the message repeater is operating within designated parameters) by comparing a feedback signal to the incoming message. The feedback signal may comprise part of a signal energy of the transmitted repeat message as received by the receiver (e.g., a transmitter-to-receiver feedback loop). Alternatively or additionally, the operation module is further configured to assess operation of the message repeater by comparing at least one signal power associated with the transmitted repeat message to at least one threshold.

For assessing operation of the message repeater, in another embodiment, the operation module is configured to generate an alert signal if a message or other information content of the feedback signal does not match a message or other information content of the incoming message, according to designated criteria (e.g., whole or partial mismatch). Alternatively or additionally, the operation module is configured to generate the alert signal if a measured forward power associated with the transmitted repeat message is below a first threshold (and/or above a second threshold), and/or if a measured reflected power associated with the transmitted repeat message is above a third threshold, and/or based on a ratio of the measured reflected power to the measured forward power (or vice versa).

In this manner, in an embodiment, by using power level monitoring and/or transmitter-to-receiver message verification feedback, the operation module is able to automatically detect failures within the message repeater.

BRIEF DESCRIPTION OF THE DRAWINGS

The present invention can be more easily understood and the further advantages and uses thereof more readily apparent, when considered in view of the following detailed description when read in conjunction with the following figures, wherein:

FIG. 3 is a schematic view illustrating another embodiment of the communication apparatus;

FIG. 4 is a time diagram of a signal processing flow, according to an embodiment;

FIGS. 5-11 are schematic views of alternative embodiments of the communication apparatus;

In accordance with common practice, the various described features are not drawn to scale, but are drawn to emphasize specific features relevant to the invention. Reference characters denote like elements throughout the figures and text.

DETAILED DESCRIPTION

An embodiment of the invention relates to a communication apparatus that includes an operation module (i.e., operation assessment module) configured for communication with a wireless message repeater. In another embodiment, the apparatus comprises the operation module and wireless message repeater in combination. In either case, the wireless message repeater is of the type having an antenna system, a receiver for receiving an incoming message, and a transmitter for transmitting a repeat message of the incoming message. (As noted above, "repeat message" means an at least partial copy of the incoming message.) The apparatus uses a transmitter-to-receiver feedback loop and/or power level monitoring to automatically monitor and assess operation of the message repeater, including, in an embodiment, generating alert signals under certain circumstances.

Figure 1:
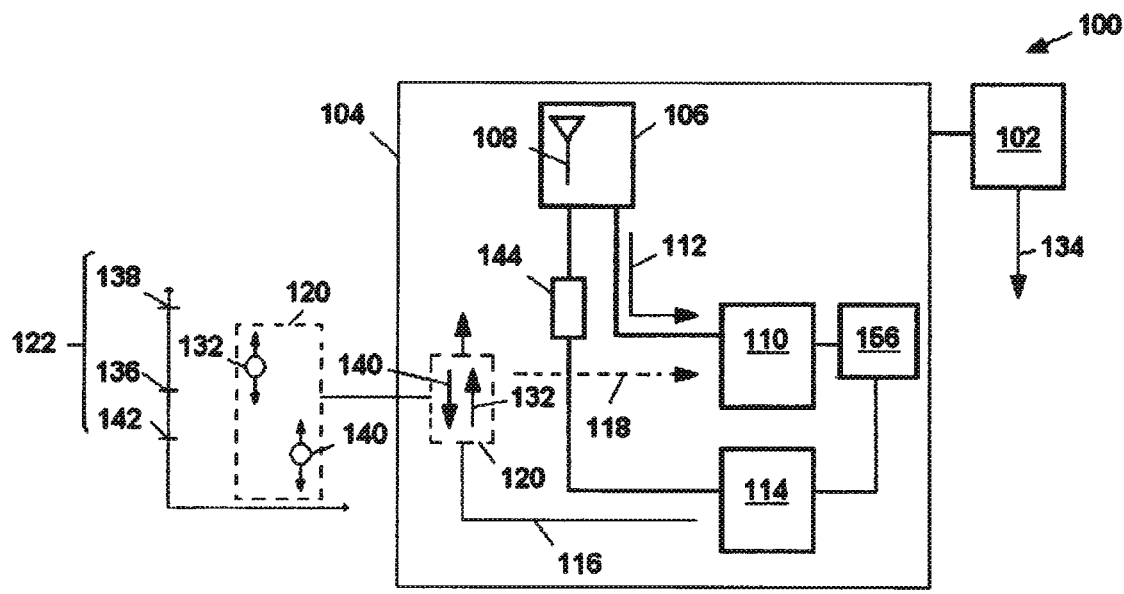
FIG. 1 is a schematic view illustrating a communication apparatus according to an embodiment of the invention.

Turning to FIG. 1, an embodiment of the invention relates to a communication apparatus 100 that includes an operation module 102 configured for communication with a wireless message repeater 104. The wireless message repeater 104 is of the type having an antenna system 106 (the system including one or more antennas 108), a receiver 110 for receiving an incoming message 112, and a transmitter 114 for transmitting a repeat message 116 of the incoming message. The operation module 102 is further configured to assess operation of the message repeater 104 by comparing a feedback signal 118 to the incoming message 112. (For example, information content of the feedback signal 118 may be compared to information content of the incoming message 112.) The feedback signal 118 comprises part of a signal energy of the transmitted repeat message 116 as received by the receiver 110. Alternatively or additionally, the operation module 102 is further configured to assess operation of the message repeater 104 by comparing at least one signal power 120 associated with the transmitted repeat message 116 to at least one threshold 122.

As indicated, the message repeater 104 is a wireless message repeater, meaning messages are received and transmitted using radio frequency (RF) or other wireless signals. For this purpose, the message repeater 104 includes the antenna system 106, the receiver 110, and the transmitter 114. The transmitter 114 and receiver 110 are operably coupled to the antenna system 106, for transmission and reception of wireless signals over the antenna system. In operation, incoming messages 112 (messages arriving at the message repeater) are picked up by the antenna system 106 and received by the receiver 110. At least some of the incoming messages 112, and potentially all of the incoming messages 112, are repeated. That is, for each incoming message 112 to be repeated, the transmitter 114 transmits a repeat message 116 that comprises an at least partial copy of the incoming message. Whether an incoming message is to be repeated may depend on the type of incoming message, on the informational content (e.g., message content) of the incoming message, on current signal/transmission conditions, or otherwise.

Figure 2:
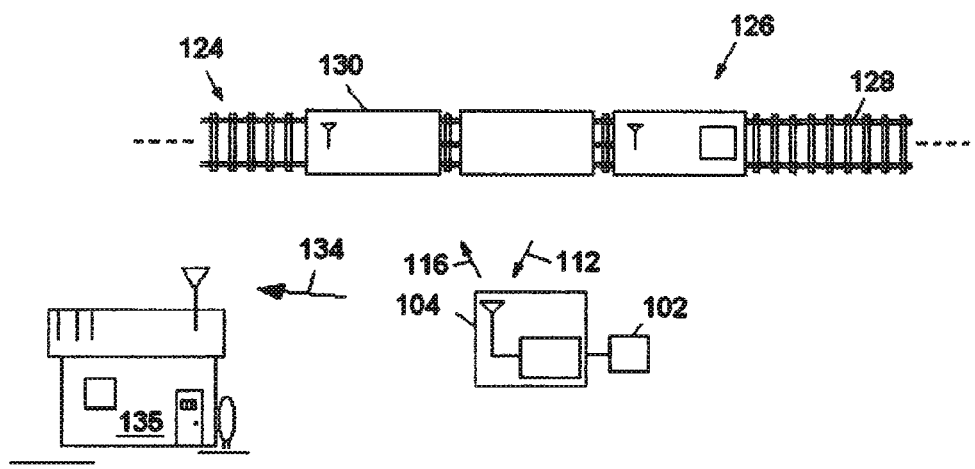
FIG. 2 is a schematic view of the communication apparatus in one possible communication context.

In an embodiment, with reference to FIG. 2, the message repeater 104 is positioned proximate to a designated vehicle route 124. The receiver 110 is configured to receive the incoming message(s) 112 from a vehicle 126 traveling along the vehicle route 124. The transmitter 114 is configured to transmit the repeat message(s) 116 back to the vehicle 126. "Proximate" to a route means close enough to the route to communicate with a vehicle on the route with RF signals of the message repeater. This includes the message repeater 104 being land-deployed (e.g., supported on a support structure attached to land), or sky-deployed (e.g., satellite). The message repeater 104 may be an off-board message repeater, meaning not on board a vehicle.

In another embodiment, the designated vehicle route 124 is a rail vehicle track 128, and each incoming message is a control message for distributed power operations of a rail vehicle 130 traveling along the track 128. Thus, in operation of the message repeater, the message repeater receives incoming control messages from the rail vehicle and (in some cases) transmits repeat messages of the incoming control messages back to the rail vehicle 130. The message repeater may be an off-board distributed power message repeater, or a tunnel-based off-board distributed power message repeater (located in a tunnel).

The operation module 102 may be configured to assess message repeater operation by monitoring power levels of the transmitted repeat messages 116. In an embodiment, for example, the operation module 102 is configured to assess operation of the message repeater 104 by comparing the at least one signal power 120 associated with the transmitted repeat message 116 to the at least one threshold 122. The at least one signal power 120 includes a measured forward power 132 associated with the transmitted repeat message 116. The operation module 102 is configured to generate an alert signal 134 if the measured forward power 132 is below a first threshold 136. The operation module 102 may also be configured to generate the alert signal 134 if the measured forward power 132 is above a second threshold 138. (As should be appreciated, the at least one threshold 122 comprises/includes the first threshold 136 and the second threshold 138.) In another embodiment, the at least one signal power 120 further includes a measured reflected power 140 associated with the transmitted repeat message 116. The operation module 102 is configured to generate the alert signal 134 if the measured reflected power 140 is above a third threshold 142. Alternatively or in addition, the operation module 102 is configured to generate the alert signal 134 based on a ratio between the measured reflected power 140 and the measured forward power 132 (meaning a ratio of measured reflected power to measured forward power or vice versa).

To explain further, the transmitter 114 transmits the repeat message(s) 116 for RF output by the antenna system 106. When the transmitted repeat message 116 reaches the antenna system 106, a portion of the signal energy of the repeat message 116 may be reflected back due to a slight impedance mismatch between the transmitter and the antenna system. Thus, associated with the transmitted repeat message 116 are two signal powers 120, namely, a forward power (a signal power of the repeat message signal traveling from the transmitter to the antenna system) and a reflected power (a power of the portion of the repeat message signal reflected back from the antenna system). The forward power and/or the reflected power are detected/measured by a power monitoring sub-system 144 interposed between the transmitter 114 and the antenna system 106. (Examples of possible component portions of the power monitoring sub-system are described below.)

As noted, the operation module 102 may be configured to generate the alert signal 134 if the measured forward power 132 is below a first threshold 136. The first threshold 136 is representative of a designated minimum acceptable power level for message transmission by the message repeater. More specifically, the first threshold 136 is chosen so that message signals with power levels above the threshold 136 are at least at a designated minimum level for transmission to vehicles or other designated recipients. Thus, power levels below the threshold 136 may be indicative of the transmitter 114 not transmitting at a sufficiently high power level (meaning a possible fault in the transmitter) or there being some other problem in the circuit between the transmitter and antenna system. The operation module 102 may also be configured to generate the alert signal 134 if the measured forward power 132 is above a second threshold 138. The second threshold 138 is selected as a designated maximum signal power in the message repeater, such that signal power levels above the threshold 138 are indicative of transmitter operation outside of designated limits or of another fault in the message repeater resulting in excessive transmitted signal power levels.

Regarding the measured reflected power 140, the third threshold 142 may be selected as a maximum allowed reflected signal power (absolute level), with values above the threshold 142 being indicative of an impedance mismatch between the transmitter and antenna system exceeding a designated level, or there being some other fault in the message repeater resulting in excessive signal reflection. Alternatively or in addition, the reflected signal power may be assessed on a relative level, with the operation module 102 being configured to generate the alert signal 134 based on a ratio of the measured reflected power 140 to the measured forward power 132 (or vice versa). For example, an alert signal 134 may be generated if the ratio of the measured reflected power 140 to the measured forward power 132 exceeds a threshold (such as 10%), the threshold being selected as a maximum allowed reflected signal power (relative level).

Figures 3, 4:
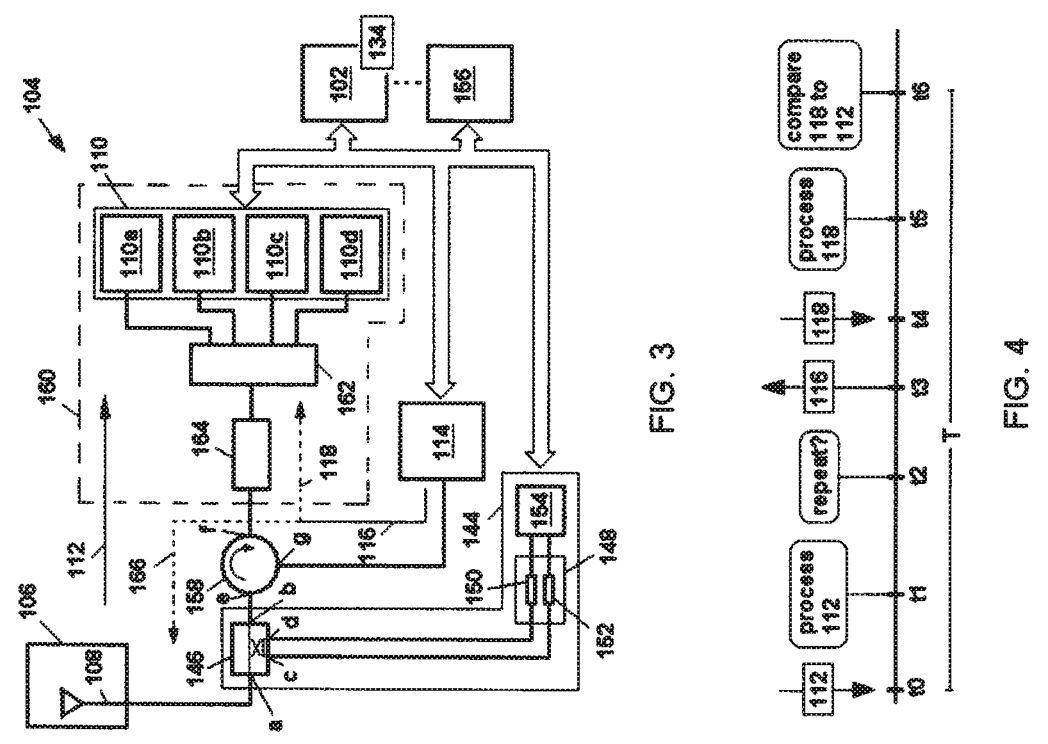

With reference to FIG. 3, in an embodiment, the power monitoring system 144 includes a directional coupler sub-system 146 and a detector sub-system 148. The directional coupler sub-system 146 is coupled between the transmitter 114 and the antenna system 106, and includes one or more directional couplers. Each directional coupler is configured to detect/measure an RF signal power by (in effect) sampling the signal as it passes through the directional coupler. That is, a small portion of the signal energy of the signal is shunted to an output port of the directional coupler, with the shunted portion being proportional to the total signal power. Directional couplers configured in this manner are available commercially, as standard RF circuit components. The directional coupler sub-system 146 outputs the measured forward power 132 by sampling a signal of the transmitted repeat message 116 that passes through the directional coupler sub-system from the transmitter to the antenna system. The directional coupler sub-system 146 also outputs the measured reflected power 140 by sampling the portion of the signal of the transmitted repeat message 116 that is reflected back from the antenna system 106. In an embodiment, the directional coupler sub-system 146 includes two directional couplers, one for the forward power and another for the reflected power. In another embodiment, the directional coupler sub-system 146 includes a bi-directional directional coupler, which is illustrated in FIG. 3. In operation, for a signal passing through the bi-directional directional coupler mainline from first port "a" to second port "b," most of the signal energy is transmitted through to port "b." However, a small portion (e.g., 0.1%) of the signal energy is shunted to a third, output port "c." Likewise, for a signal passing through the coupler mainline from port "b" to port "a," most of the signal energy is transmitted through to port "a." However, a small portion of the signal energy is shunted to a fourth, output port "d." Thus, where "b"→"a" corresponds to the transmitter-to-antenna system direction, and "a"→"b" corresponds to the antenna system-to-transmitter direction, the signal output at the third port "c" constitutes a measured reflected power and the signal output at the fourth port "d" constitutes a measured forward power. (In the illustrated example, port "c" would also output a signal of the measured power of the incoming messages, but such signals could be ignored based on timing considerations and/or signal power levels.) In another embodiment, the directional coupler sub-system 146 includes a dual directional coupler.

The detector sub-system 148 is connected to the output(s) of the directional coupler sub-system 146. The detector sub-system 148 is configured to convert the signal output(s) of the directional coupler sub-system for use by the operation module 102 in comparing a signal power (or more than one signal power) associated with the transmitted repeat message to one or more thresholds 122. In one embodiment, the detector sub-system 148 is configured to convert a sampling output of the forward power of the directional coupler sub-system, constituting the measured forward power, for use by the operation module 102 in comparing the measured forward power of the transmitted repeat message to one or more thresholds 122. In another embodiment, the detector sub-system 148 is configured to convert sampling outputs of the directional coupler sub-system (a sampling output of the forward power, constituting the measured forward power, and a sampling output of the reflected power, constituting the measured reflected power) for use by the operation module 102 in: comparing the measured forward power and measured reflected power to various thresholds 122; and/or computing a ratio of the measured reflected power to the measured forward power (or vice versa).

In an embodiment, the detector sub-system 148 includes at least one RF detector 150, 152, each of which converts the signal energy of an output signal of the directional coupler sub-system (e.g., the measured forward power and/or measured reflected power) into an analog voltage. The analog voltage can be read by a threshold detector portion 154 (or a microprocessor analog-to-digital input that functions in a similar manner as a threshold detector) of the operation module 102, for assessing the measured forward power and/or measured reflected power against one or more thresholds, or for ratio calculation/assessment, as described above. In another embodiment, the detector sub-system 148 includes two RF detectors 150, 152, which may be separate RF detectors, used for converting the output signals of the directional coupler sub-system (the measured forward power and measured reflected power) into respective analog voltages for use by the operation module 102.

The detector sub-system 148 converts outputs of the directional coupler sub-system (e.g., sampling output signals comprising the measured forward power and the measured reflected power) into a format for use by the operation module 102. The format may be an analog voltage within a particular voltage range, or other types of signals with designated characteristics.

As shown in FIG. 1, the message repeater 104 may include a control circuit 156, such as a microcontroller and/or other electronic circuitry (embodiments of which are described below in more detail), operably connected to certain components of the message repeater (e.g., the receiver and transmitter) for controlling and/or communicating with those components. For example, the control circuit 156 may receive demodulated incoming messages from the receiver, decode the message or other information content of the incoming messages, and control the transmitter to transmit repeat messages of the incoming messages as a function of the decoded message or other information content. The control circuit 156 may be distributed in nature, that is, it may comprise a system of components that includes components in the receiver, components in the transmitter, components that are part of other sub-systems in the receiver, and/or stand-alone components like a microcontroller and related support circuitry.

The operation module 102 includes one or more hardware and/or software components that are configured to carry out the functionality of the operation module 102 as described herein. (Software refers to instructions, stored in memory on in another tangible medium, which are executed by or otherwise used as the basis for controlling a controller or other electronic circuit to perform certain functions as designated in the instructions.) The operation module 102 may be, or it may include, a separate electronic unit (such as a microcontroller), and/or it may be wholly or partially distributed among the control circuit 156 and/or other components of the message repeater. In one embodiment, the operation module 102 includes one or more software components associated with (e.g., stored in memory of) the control circuit 156. Other embodiments of the operation module are described below.

The alert signal 134 (also referred to as an alarm signal) is a signal relating and/or responsive to the detection or determination of a designated condition in or of the message repeater 104, which may be the result of or otherwise relate to a fault in the message repeater. Example alert signals include signals for storing a message in a fault log, signals for generating alarm indicia on an operator interface (to alert an operator), signals for transmitting an alarm/alert-related message to a remote facility 135 (such as a facility owned by an entity operating the message repeater), signals for controlling the message repeater, and signals for controlling some other device, such as a backup repeater or backup circuitry in the message repeater. In an embodiment, the alert signal 134 is a wireless or wired signal transmitted to a designated recipient, such as a remote facility of an operator or owner of the message repeater. In another embodiment, the alert signal is a signal communicated to the control circuit 156, which is configured to respond to the alert signal by communicating an alarm or other message to a remote facility 135, by entering a particular operational mode, by logging fault data, or otherwise. Different types of alert signals may be generated depending on the type of fault detected, and/or multiple alert signals may be generated upon detecting a fault.

FIG. 3 illustrates several sub-systems/components that may be part of various embodiments of the communication apparatus, and is also illustrative of another embodiment of the apparatus (message repeater and/or operation module) generally. Here, the message repeater 104 includes an antenna system 106, an RF circulator 158, a transmitter 114, and a multi-channel receiver section 160. The multi-channel receiver section 160 includes: a multi-channel receiver 110 having four receiver units 110a, 110b, 110c, 110d (each receiver unit is for a different communication channel); a 4-way power divider 162; and a protection circuit 164. The RF circulator 158 is coupled between the transmitter 114, receiver section 160, and antenna system 106. More specifically, the RF circulator 158 is (in this example) a three-port ferromagnetic passive device, with a first port "e" being coupled to the antenna system 106, a second port "f" being coupled to an input of the receiver section 160, and a third port "g" being connected to an output of the transmitter 114. The RF circulator 158 generally functions to pass a signal received at its first port "e" to the second port "f" but not the third port "g," and to pass a signal received at its third port "g" to the first port "e" but not the second port "f." Thus, the RF circulator 158 passes signals (e.g., incoming messages) from the antenna system to the receiver section, and passes signals (e.g., repeat messages) from the transmitter to the antenna system. This allows the receiver section and transmitter to share a common antenna 108. RF circulators are commercially available as standard RF circuit components.

The protection circuit 164 of the receiver section 160 is coupled to the RF circulator 158, and includes one or more components for protecting the receiver 110. For example, the protection circuit 162 may be configured to protect the receiver from certain incoming signals, based on designated signal criteria for this purpose (e.g., power level that exceeds a maximum allowed power level). The protection circuit 162 may include an RF attenuator and an RF limiter.

The 4-way power divider 162 has an input connected to an output of the protection circuit 162, and four outputs, each of which is coupled to a respective receiver unit 110a-110d. The power divider 162 divides incoming signals, with the divided signals being passed on to the receiver units 110a-110d. The receiver units 110a-110d each operate in a different channel (four channels in this example), which are the designated communication channels of the communication system in which the message repeater is used. For example, if the message repeater is used for repeating rail vehicle distributed power messages, then the channels of the receiver 110 are the designated channels used for wireless communications in the distributed power system.

As discussed above, the operation module 102 may be configured to assess operation of the message repeater 104 by comparing a feedback signal 118 to the incoming message 112 (e.g., comparing message or other information content of the feedback signal to message or other information content of the incoming message). In the embodiment of FIG. 3, the feedback signal 118 comprises part of a signal energy of the transmitted repeat message 116, as received by the receiver 110. That is, of the signal of the transmitted repeat message 116, part of the signal energy is shunted to the receiver 110 in a feedback loop (as the feedback signal 118), and the remaining part 166 of the signal energy is passed on towards the antenna system. Although the feedback signal 118 has a lower power level than the remaining part 166, the power level of the feedback signal 118 is sufficient for reception by the receiver 110 and for conveying an information content of the repeat message 116 to the receiver 110 (and thereby to the operation module).

In an embodiment, the RF circulator 158 is used to generate the feedback signal 118. In particular, for normal RF circulator operation, as described above (a signal arriving at one port goes to the next port but not the third port), there is impedance matching at the three ports (ports "e," "f," and "g"). In the apparatus as shown in FIG. 3, a deliberate impedance mismatch is established between a port of the RF circulator to which the transmitter 114 is connected (port "g") and a port of the RF circulator to which the antenna system 106 is connected (port "e"). A deliberate impedance mismatch may be established by modifying the RF circulator, by selecting an RF circulator with particular characteristics, and/or by selecting a transmission cable (for connection of the transmitter to the RF circulator) that has a different impedance than the port of the RF circulator. Thus, in operation, when the transmitter 114 transmits a repeat message 116, part of the signal energy is shunted to the receiver 110 as the feedback signal 118, because of the impedance mismatch of the RF circulator. The impedance mismatch is selected to provide enough signal power for the feedback signal 118 to be received by the receiver 110 and understood for informational content. (If the message repeater includes a receiver section with a protection circuit 164, the protection circuit 164 is configured to allow passage of the feedback signal 118 to the receiver 110.)

For assessing operation of the message repeater 104 using the feedback signal 118, the feedback signal 118 is demodulated and/or otherwise processed for determination of its information content. The feedback signal may be processed (e.g., by the receiver 110 and control circuit 156) in the same way as incoming messages 112. The operation module 102 then compares the information content of the feedback signal 118 to the incoming message 112 in question, that is, the incoming message 112 that resulted in the repeat message 116 that produced the feedback signal 118. More specifically, with reference to FIG. 4, within a given operational iteration "T," the following occurs: (i) an incoming message 112 is received at t0 (the start of the operational iteration); (ii) the incoming message 112 is processed at subsequent time t1 (e.g., for determining the message content or other information content of the incoming message); (iii) as a function of the information content, a decision is made, at subsequent time t2, whether to repeat transmit the incoming message; (iv) assuming so, at subsequent time t3, a repeat message 116 of the incoming message 112 is transmitted; (v) at subsequent time t4, a feedback signal 118 of the repeat message 116 is generated and received at the receiver; (vi) at subsequent time t5, the feedback signal 118 is processed for determining its information content; and (vii) at subsequent time t6, the information content of the feedback signal 118 is compared to the information content of the incoming message 112. (For this purpose, the information content of the incoming message is temporarily saved, stored, held, or otherwise maintained, at t1, until needed at t6.)

In an embodiment, the operation module 102 is configured to generate an alert signal 134 if there is a mismatch between information content of the feedback signal 118 and information content of the incoming message 112, according to designated criteria. For example, it may be the case that an alert signal 134 is generated if any part of the entire information content is different in any way. This may be done if the repeat messages are meant to be exact copies of the incoming messages. In another example, an alert signal is generated only if certain designated parts of the information content are different. This may be done if certain portions of the repeat messages are meant to change (such as message headers and footers), but certain other parts of the repeat messages are meant to exactly copy corresponding parts of the incoming messages (such as message bodies). In either case, if there is a mismatch according to the designated criteria, this indicates that the transmitter 114 (or some other component/sub-system in the message repeater) may not be operating correctly, and an alert signal is generated.

Figure 5:
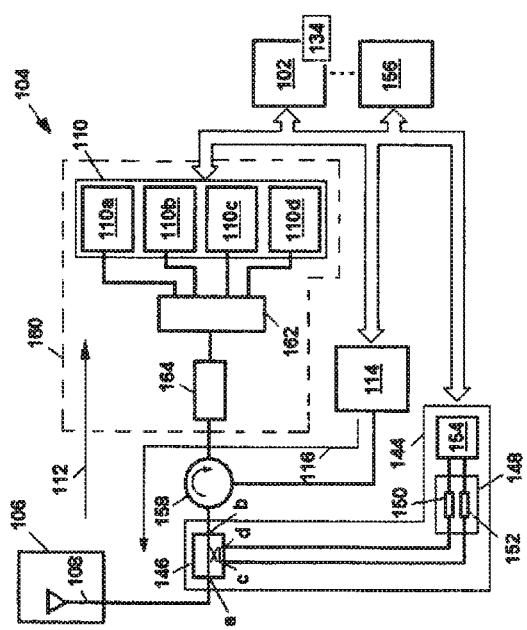
Figure 6:
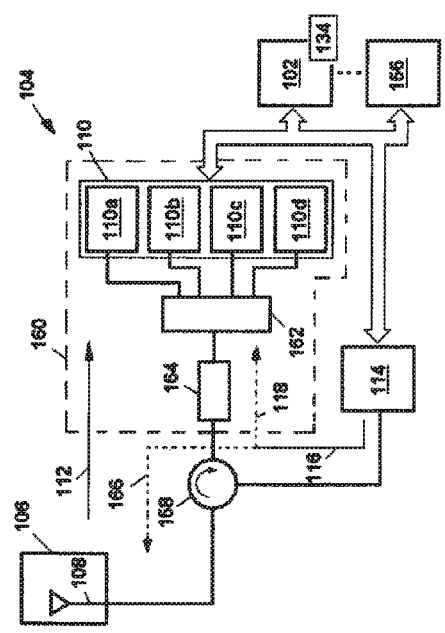

In various embodiments, the operation module is configured to assess message repeater operation using both a message feedback loop (e.g., comparing a feedback signal to an incoming message) and power level monitoring (e.g., comparing a power level of transmitted repeat messages to one or more threshold values), as illustrated generally in FIGS. 1 and 3. In another embodiment, however, the operation module is configured to assess message repeater operation using only a message feedback loop, and in another embodiment, using only power level monitoring. Respective examples are shown in FIGS. 6 and 5.

Although FIG. 3 shows an RF circulator 158 used for both connection of a common antenna and feedback signal generation, other mechanisms could be used instead. An example is shown in FIG. 7. Here, a receiver 110 and transmitter 114 are connected to a common antenna 108 by a duplexer 168. Additionally, for generating a feedback signal 118, a feedback device 170 is coupled between the transmitter 114 and duplexer 168. Signals generated by the transmitter 114 (e.g., signals of repeat messages) are passed through the feedback device 170, which in effect generates a copy of the transmitted signals and communicates the copy to the receiver 110 input. As illustrated, the output of the feedback device 170 could be connected to the receiver input by a combiner 172.

In an embodiment, the feedback device 170 shunts part of the energy of the transmitted signal to the receiver 110 as the feedback signal 118. For doing so, the feedback device 170 may be a transformer-based device. Alternatively, the feedback device 170 may be an RF splitter. In an embodiment, the RF splitter is configured so that more of the signal energy passes on to the antenna system than to the receiver (that is, the RF splitter has two outputs, with more incoming signal energy passing to the first output, connected to the antenna system, than the other output, connected to the receiver input).

In the embodiment shown in FIG. 8, a feedback device 170 is coupled between the transmitter 114 and duplexer 168. The feedback device 170 senses RF signals (e.g., the signals of repeat messages) transmitted by the transmitter 114, and outputs a copy of the RF signal, but does not substantially decrease (or does not decrease at all) the power of the transmitted signal. An amplifier 174 may be disposed between the secondary/feedback output of the feedback device 170 and input of the receiver 110 for increasing the level of the copied output RF signal of the feedback device 170 to at least a minimum level required for reception by the receiver 110.

In the embodiments shown in FIGS. 9 and 11, the feedback signal output of a feedback device 170 is not passed to the message repeater receiver 110, but is instead passed to a separate receiver device 176. The separate receiver device 176 receives and demodulates the feedback signal, and either passes the demodulated signal to other system components (e.g., control circuit 156 or operation module 102) for determination (e.g., decoding) of information content, or determines the information content itself and passes the information content to the operation module 102.

FIGS. 10 and 11 illustrate that the antenna system 106 may include first and second antennas 108a, 108b, one used for signal transmission and the other for signal reception, respectively. In the embodiment of FIG. 10, incoming messages are received over the second antenna 108b and conveyed to the receiver 110. The transmitter 114 transmits repeat messages of the incoming messages over the first antenna 108a. A feedback device 170 is disposed between the transmitter output and first antenna input. The feedback device 170 generates feedback signals of the transmitted repeat messages, which are shunted to the receiver input. Alternatively, as shown in FIG. 11, the feedback signals may be conveyed to a separate receiver device 176.

Any of the embodiments of FIGS. 7-11 may also include a power monitoring sub-system 144 as described herein. Additionally, the embodiments of FIGS. 7-9 could employ an RF circulator or other similar device instead of a duplexer 168. (In the case of an RF circulator in these embodiments, the circulator would not have a deliberate port mismatch.)

In an embodiment, the operation module 102 compares the incoming messages 112 to a known, designated message format or formats. The designated formats are used for message communications in the communications system in which the message repeater is meant for use. If the incoming messages 112 do not match the designated format, then the operation module 102 may generate an alert signal indicative of a possible receiver fault. In another embodiment, an alert signal is only generated if the number or percentage of mismatched incoming messages is above a designated threshold, and/or if a time period in which mismatched incoming messages are received is greater than a designated time threshold. (This is to account for transitory faults in the message repeater system.)

In another embodiment, the communication apparatus is configured to perform a receiver self-check. Here, the operation module 102 controls the transmitter 114 to transmit a known signal (e.g., a test message or other test signal). A feedback signal of the transmitted known signal is generated and received by the receiver 110, in a manner as described herein. The operation module 102 compares the received feedback signal to the known signal. If there is a mismatch between the two, the operation module 102 generates an alert signal indicative of a possible receiver fault. The operation module may be configured to control the transmitter for transmitting the known signal at a designated time, such as when the message repeater is not currently functioning to repeat transmit incoming messages. Alternatively or in addition, the known signal may be of a type or configuration that would not interfere with communication systems operations (e.g., of a rail vehicle distributed power communications system) when transmitted wirelessly.

Figure 12:
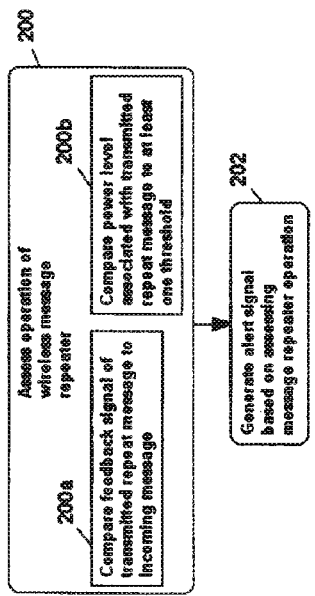
FIGS. 12 and 13 are flow charts of two communication methods, according to embodiments of the invention.

With reference to FIG. 12, an embodiment of the invention relates to a communication method. The communication method includes a step 200 of assessing operation of a wireless message repeater, and a step 202 of generating an alert signal based on the assessment (i.e., based on having assessed the message repeater operation). The wireless message repeater includes a receiver for receiving an incoming message and a transmitter for transmitting a repeat message of the incoming message. The step 200 of assessing operation of the wireless message repeater includes either or both of steps 200*a*, 200*b*. More specifically, message repeater operation is assessed by the step 200*a* of comparing a feedback signal of the transmitted repeat message to the incoming message, and/or the step 200*b* of comparing a power level associated with the transmitted repeat message to at least one threshold.

In another embodiment of the communication method, message repeater operation is assessed by comparing the feedback signal of the transmitted repeat message to the incoming message. The feedback signal comprises part of a signal energy of the transmitted repeat message as received at the receiver of the wireless message repeater.

In another embodiment of the communication method, message repeater operation is assessed in step 200*a* by comparing an information content of the feedback signal to an information content of the incoming message. In another embodiment, message repeater operation is further assessed in step 200*b* by comparing the power level associated with the transmitted repeat message to the at least one threshold.

In another embodiment, the alert signal is generated if the information content of the feedback signal does not match the information content of the incoming message, according to designated criteria (as used herein, criteria means one or more criterion). Each designated criteria is a pre-established rule regarding the character and/or degree of mismatch (between the feedback signal and incoming message) required for an alert signal to be generated. For example, it may be the case that any mismatch whatsoever results in an alert signal. Alternatively, it may be the case that an alert signal is generated only if a certain part of the feedback signal and incoming message mismatch.

In another embodiment, message repeater operation is assessed, as in step 200*b*, by receiving a measured forward signal power associated with the transmitted repeat message, comparing the measured forward signal power to a first threshold and/or to a second threshold, receiving a measured reflected signal power associated with the transmitted repeat message, and computing a ratio between the measured reflected signal power and the measured forward signal power (and/or comparing the measured reflected signal power to a third threshold). The alert signal is generated, as in step 202, based on the comparison of the measured forward signal power to the first threshold and/or to the second threshold. The alert signal is also generated based on the ratio between the measured reflected signal power and the measured forward signal power (e.g., the alert signal may be generated if the ratio is above or below a particular designated ratio threshold), and/or on the comparison of the measured reflected signal power to the third threshold.

Figure 13:
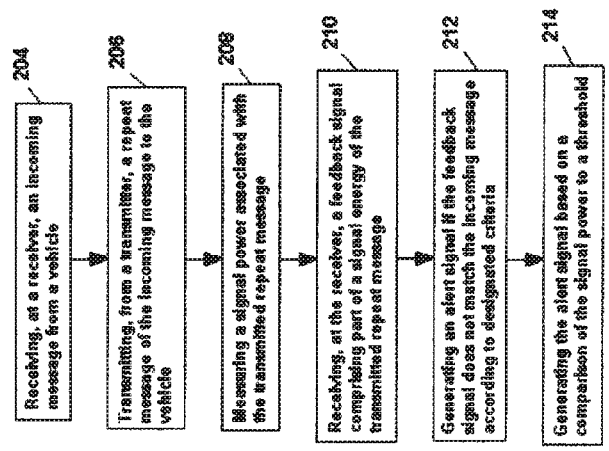

FIG. 13 illustrates another embodiment of a communication method. The method includes receiving, at a receiver, an incoming message from a vehicle, as at step 204. The method further includes transmitting, from a transmitter, a repeat message of the incoming message to the vehicle, as at step 206. At step 208, a signal power associated with the transmitted repeat message is measured. At step 210, a feedback signal is received at the receiver. The feedback signal comprises part of a signal energy of the transmitted repeat message. The method further includes, as at step 212, generating an alert signal if the feedback signal does not match the incoming message according to designated criteria. At step 214, the alert signal is generated based on a comparison of the signal power to a threshold.

In another embodiment, the communication method of FIG. 13 further includes a step of measuring a forward signal power associated with the transmitted repeat message. The method further includes a step of measuring a reflected signal power associated with the transmitted repeat message. The method further includes a step of generating the alert signal based on a comparison of the measured forward signal power to a first threshold and/or to a second threshold. The method further includes a step of generating the alert signal based on a ratio between the reflected signal power and the measured forward signal power and/or based on a comparison of the measured reflected signal power to a third threshold.

In another embodiment, the communication method of FIG. 13 further includes a step of transmitting, from the transmitter, a known signal. A second feedback signal is received at the receiver. The second feedback signal comprises part of a signal energy of the transmitted known signal. The method further includes generating the alert signal if the second feedback signal and the known signal do not match according to second designated criteria.

Embodiments of a communication method and apparatus may significantly improve the ability to detect a failure within a wireless message repeater (e.g., a distributed power message repeater) by means of RF power level monitoring and end-to-end transmitter-to-receiver message verification. In the former, forward and reflected power levels are sampled by means of a directional coupler, and these levels are measured to determine proper output and reflected power. In the latter, a feedback loop to a receiver is used to dynamically verify that every repeat message is successfully generated and transmitted. This method verifies the proper operation of virtually the entire message repeater system.

In an embodiment, proper message repeater operation is verified based on RF power level measurements. An RF directional coupler is installed in the transmitter-to-antenna system path, for taking samples of the forward and reflected RF power, which are sent to two separate RF detectors. The detectors convert the sampled RF energy into an analog voltage that is read by a threshold detector or a microprocessor analog-to-digital input that functions in a similar manner as a threshold detector. When the forward RF power drops below a preset threshold, or the reflected RF power rises above a preset threshold, an alert signal is sent to the message repeater control circuit to alert it of a potential problem in the transmitter, antenna, or antenna cabling. The control circuit then takes appropriate action, such as alerting an external monitoring device or other fault reporting system.

In another embodiment, message repeater operation is assessed using a feedback loop/path. In particular, the RF path of the transmitter and receiver of the message repeater are designed in such a manner that a small amount of the transmitted RF energy of the repeat message appears at the receiver (in the case of a multi-channel receiver with multiple receiver units, a small amount of the transmitted RF energy of the repeat message appears at each receiver unit). This constitutes the feedback path. The particular receiver unit that is tuned to the channel that the transmitter is using at that time will, in turn, demodulate and pass the feedback signal back to the message repeater control circuit. The control circuit will simultaneously decode the feedback signal and compare it to what was received (the incoming message). If there is a discrepancy between what was transmitted and what was received, the operational module (e.g., implemented as part of the repeater control circuit) then takes appropriate action, such as alerting an external monitoring device or other fault reporting system. This feedback method, in effect, performs a complete end-to-end test of the entire message repeater system on a continuous basis.

As noted above, the message repeater may be an off-vehicle distributed power message repeater, or a tunnel-based off-vehicle distributed power message repeater (located in a tunnel). The distributed power message repeater is designed for use in marginal communication areas, such as in tunnels or deep cuts, to assist in RF communication between rail vehicles in a consist equipped with distributed power equipment. The message repeater may be compatible with the following distributed power systems: distributed power III, distributed power IV, LSI, LEB, and IFC. It is also useful where obstacles and radio multi-path interference pose a problem, such as in large train yards. The message repeater receives, stores, and selectively retransmits distributed power messages. A single zone message repeater system is configured to operate with a single set of RF equipment (four receivers and one transmitter per RF chassis), while a dual zone system is configured to operate with two sets of RF equipment.

In an embodiment, the message repeater constantly monitors all distributed power radio channels for rail vehicle consists (e.g., trains) needing repeater help. If a rail vehicle consist is heard requesting repeater assistance, this consist is placed on the message repeater's active list. Consists are placed on the active list if a lead sub-consist of the rail vehicle sends a message that requests repeater assistance, or if a lead is found linking to a remote. Each rail vehicle consist remains on the active list for a predefined period of time. Once the time has elapsed, the rail vehicle consist is removed from the active list and the message repeater no longer relays distributed power messages. If the rail vehicle consist is still in need of repeater help, it must again request repeater help to get back on the active list.

In an embodiment, the operation module 102 is implemented, in whole or part, as an add-on device that permits remote monitoring of the operational status of a message repeater and reports back to a remote facility in the event of a failure. The operation module monitors various key elements of the message repeater (e.g., elements that may affect its performance) and reports any alarm conditions back to the remote facility. Alert signals may be implemented using an alarm relay and/or a serial interface. The operation module may be configured to routinely check and report on one or more of the following sub-systems of the message repeater: antenna; transmitter and associated components; receivers and associated components; store and forward assembly function; CPU card watchdog timer; and/or DC input power. The operation module may also be configured to perform one or more of the following troubleshooting and maintenance-related function: a single or dual tone transmit function for deviation measurement; channel selectable transmit function; a manually initiated self-test function; and user scheduled automatic self-test function.

For operational assessment based on forward power measurement, in an embodiment, each time the message repeater keys the transmitter, either as the result of normal repeating operation or a self-check, the forward RF and reflected RF power are measured. If the RF output power is too low or too high, the operation module will open the alarm relay, and set either a "low forward power" or "high forward power" alarm field in the serial interface.

For operational assessment based on reflected power measurement, in an embodiment, the reflected power is measured in the same manner in which forward power is measured, which occurs every time the transmitter is keyed. If a calculation of the ratio of forward to reflected power indicates a high VSWR condition, the operation module opens the alarm relay, and sets a "high VSWR" alarm field in the serial interface.

In an embodiment, each time the message repeater transmits a repeat message, a feedback signal of the transmitted repeat message (in effect, a lower power copy of the transmitted repeat message) is also received by the message repeater's receive units. Since receipt of the feedback signal is actually being provided by the message repeater's own receivers, the proper operation of both the transmitter and the receiver are verified with each transmission. Once the received feedback signal is received and decoded, various components of the information content of the feedback signal are verified.

In an embodiment, the operation module is configured to initiate a loop back and repeat self-test. This can be either manually activated by means of a user interface, by serial control, or can result from a user defined schedule. When the self-test is activated, the transmitter is controlled to transmit a known signal (e.g., a test message) designed to elicit a message repeater's repeat response. When the test message or other known signal is initially transmitted, the proper receipt of the known signal, by means of the message repeater's own receivers, is verified as described above. After the known signal (e.g., test message) is transmitted, however, the operation module may also verify that the message repeater properly repeats the known signal (e.g., test message) in the appropriate radio protocol time slot. In the event that the transmitted message is not received correctly, or the message repeater fails to repeat the known signal (e.g., test message), the alarm relay is opened and the appropriate alarm field in the serial interface is set. For multi-channel receivers, respective test messages may be generated at the frequency of each receiver unit, for testing each receiver unit.

In an embodiment, the operation module is configured to execute a self-test on a user-defined schedule to ensure that each channel is verified as operational on a routine basis. This may be required in areas where there is little to no message repeater traffic for long periods of time. In an embodiment, the scheduled self-check can be configured to run the self check in periods from once every thirty minutes to once every twenty-four hours. In addition, the user may select if this check is always conducted, or only executed if that channel has not successfully repeated distributed power traffic within that same specified time period.

In an embodiment, power of the message repeater (or portion thereof) is automatically cycled upon occurrence of an alert signal. To prevent the message repeater from going into a continuous cycle of power resets (due to certain types of faults), there may be a maximum number of allowed power resets before service is required.

In another embodiment, message repeater power supply levels are monitored, and an alert signal generated if the levels go above or below a preset value.

In another embodiment, the operation module is configured to control the message repeater, upon receipt of a designated control signal(s), to transmit a tone or tones to assist in transmitter deviation measurement and troubleshooting of the transmitter portion of the message repeater. Examples include transmitting a continuous mark (e.g., 1300 Hz) audio tone, and transmitting an alternating sequence of mark and space (e.g., 1300/2100 Hz) tones. The tones and transmission will remain active for as long as the designated control signal is present, and/or up to a maximum test time period (e.g., sixty seconds).

In another embodiment, in a multi-channel message repeater, the operation module includes (i) a user interface for selecting which of plural channels to test (e.g., by transmitting a test signal), and (ii) a switch for user initiation a test on the selected channel. For example, a test may be run on the selected channel for so long as the switch is depressed and/or for a designated maximum time period.

Figure 14:
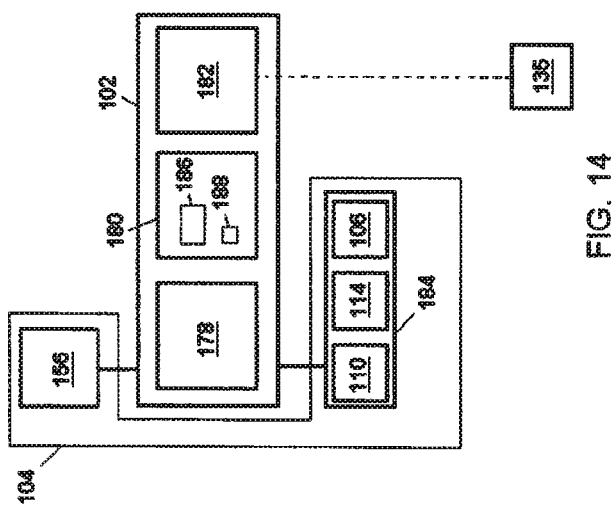
FIG. 14 is a schematic diagram of another embodiment of a communication apparatus.

FIG. 14 is illustrative of several aspects of the invention. First, as noted above, the operation module 102 may be an add-on monitoring unit for a message repeater 104. The message repeater 104 includes an RF equipment assembly 184 and a control circuit 156, such as a message repeater store-and-forward assembly. More specifically, the RF equipment assembly 184 includes the transmitter 114, receiver 110, antenna system 106, etc. for transmitting, receiving, and demodulating messages. The message repeater store-and-forward assembly assesses incoming messages for repeat transmission, and controls the transmitter 114 for transmitting repeat messages (among other possible functions). The operation module 102 is disposed between the RF equipment assembly 184 and the message repeater store-and-forward assembly 156, and is operably connected to both for carrying out the various functions as described herein. For example, the operation module 102 may be configured to control, receive information from, and/or operate in conjunction with the message repeater store-and-forward assembly for receiving decoded incoming messages and decoded feedback signals from the message repeater store-and-forward assembly, and comparing the two according to designated criteria, for assessing message repeater operation and possibly generating an alert signal. For this purpose, the operation module may include various electronic processing and control circuits/units 178.

According to another aspect, the operation module 102 may have a user interface portion 180. The user interface 180 may include a display or other controllable indicia (e.g., LED's) 186, and a switch or other user controls 188, as described elsewhere herein.

According to another aspect, the operation module 102 may have a communications section 182, such as a wireless unit and/or a serial interface, for communicating with a customer office or other remote facility 135. For example, the communications section 182 may be used to transmit alert signals to the remote facility, under conditions as described herein.

Figure 15:
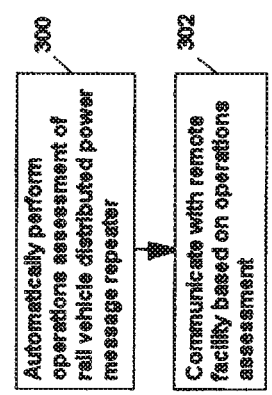
FIG. 15 is a flow chart of another embodiment of a communication method.

FIG. 15 illustrates another embodiment of a communication method. The method comprises a step 300 of automatically performing an operations assessment of a rail vehicle distributed power message repeater (e.g., in a manner as described elsewhere herein), and a step 302 of communicating with a remote facility based on the operations assessment. The message repeater (positioned proximate to a rail vehicle track or otherwise, e.g., on-board) is configured to wirelessly repeat distributed power messages for a train or other rail vehicle traveling along the track (i.e., receive incoming messages from the rail vehicle and transmit repeat messages back to the rail vehicle). Communicating with the remote facility may include transmitting alert signals to the remote facility, if the operations assessment indicates a fault condition in the message repeater. "Automatically" performing means performing without human initiation or involvement.

In another embodiment, the automatic operations assessment of the message receiver is performed automatically by the communication apparatus (operation module and/or message repeater), on a periodic basis (such as an automatic periodic self-check) and/or during normal operating of repeating messages. The automatic assessment includes assessing operations of one or more electronic components and/or electronic sub-systems in the message repeater, using one or more of the methods described herein or otherwise. In an embodiment, the automatic assessment includes transmission power level monitoring and/or a transmitter-to-receiver message verification feedback loop. (Transmitter-to-receiver message verification may be done periodically as a self-check, using known signals, e.g., test messages, and/or it may be done automatically during ongoing operations of the message repeater for repeating messages.) Automatic communications with the remote facility may include sending messages or other signals with information relating to the automatic assessment, including transmitting alert signals when faults are detected.

In another embodiment, a method includes a step of receiving a message or other signal from a communication apparatus, the apparatus including a rail vehicle distributed power message repeater. The message or other signal relates to an automatic operations assessment of the message repeater. The message or other signal is received at a facility remote from the message repeater. The method further comprises determining a corrective action (e.g., a repair) for the message repeater based on the received message or other signal. When the corrective action is implemented, the message repeater is transformed from a first state (e.g., electronics configured in a manner resulting in incorrect operation) to a second, different state (e.g., electronics configured in a manner resulting in correct action). In an embodiment, the corrective action is determined automatically by a computer system at the remote facility, such as by comparing the contents of the message or other signal received from the message repeater to a diagnostics database that correlates symptoms to particular known faults.

Although embodiments are illustrated as involving receiving incoming messages from a vehicle (or other source) and transmitting repeat messages back to the vehicle (or other source), the repeat messages could instead be transmitted to another vehicle or other destination.

In an embodiment, a facility is "remote" from a message repeater if it is outside the communications range of the message repeater for message repeating operation. Additionally, unless specifically identified as an individual car, the term "rail vehicle" includes both individual cars and groups of cars linked together as a train or other consist. The phrase 'ratio between "A" and "B"' encompasses A/B and B/A.

Although embodiments are described here in regards to off-board message repeaters, aspects of the invention are also applicable to on-board message repeaters.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-language equivalents of the respective terms "comprising" and "wherein." Moreover, in the following claims, the terms "first," "second," and "third," etc. are used merely as labels, and are not intended to impose numerical requirements on their objects. Further, as used herein, "criteria" means one or more criterion.

This written description uses examples to disclose several embodiments of the invention, including the best mode, and also to enable any person of ordinary skill in the art to practice the embodiments of invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Since certain changes may be made in the above-described apparatuses and methods for repeating communication messages in a rail vehicle system, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A communication apparatus comprising:
   an off-board wireless message repeater configured to be positioned proximate to a vehicle route, the message repeater having an antenna system, a transmitter, and a receiver, the transmitter and receiver operably coupled to the antenna system, the receiver configured to receive an incoming message from a vehicle traveling along the route and the transmitter configured to transmit a repeat message of the incoming message to the vehicle; and
   an operation module configured to communicate with the message repeater, wherein:
      the operation module is configured to generate an alert signal if a message or other information content of a feedback signal does not match a message or other information content of the incoming message, the feedback signal comprising part of a signal enemy of the transmitted repeat message as received by the receiver; and
      the operation module is configured to generate the alert signal if a measured forward power associated with the transmitted repeat message is below a first threshold.

2. The communication apparatus of claim 1 further comprising a directional coupler sub-system coupled between the transmitter and antenna system, the directional coupler sub-system configured to measure the forward power by sampling a signal of the transmitted repeat message that passes through the directional coupler sub-system from the transmitter to the antenna system.

3. The communication apparatus of claim 2 further comprising a detector sub-system connected to the directional coupler sub-system, the detector sub-system configured to convert a sampling output of the forward power of the directional coupler sub-system into a format for use by the operation module in comparing the measured forward power to the first threshold.

4. The communication apparatus of claim 1 further comprising an RF circulator coupled between the receiver, the transmitter, and the antenna system for passing the incoming message from the antenna system to the receiver and the repeat message from the transmitter to the antenna system, wherein the feedback signal is generated through an impedance mismatch between a port of the circulator to which the transmitter is connected and a port of the circulator to which the antenna system is connected.

5. The communication apparatus of claim 1 wherein the alert signal that is generated if the message or other information content of the feedback signal does not match the message or other information content of the incoming message is different than the alert signal that is generated if the measured forward power associated with the transmitted repeat message is below the first threshold.

6. A communication method comprising the steps of:
   receiving, at a receiver, an incoming message from a vehicle;
   transmitting, from a transmitter, a repeat message of the incoming message to the vehicle;
   measuring a signal power associated with the transmitted repeat message;
   receiving, at the receiver, a first feedback signal comprising part of a signal energy of the transmitted repeat message;
   generating an alert signal if the first feedback signal does not match the incoming message according to first designated criteria; and
   generating the alert signal based on a comparison of the signal power to a threshold.

7. The communication method of claim 6 further comprising:
   measuring a forward signal power associated with the transmitted repeat message;
   measuring a reflected signal power associated with the transmitted repeat message;
   generating the alert signal based on a comparison of the measured forward signal power to a first threshold and/or to a second threshold; and
   generating the alert signal based on a ratio between the reflected signal power and the measured forward signal power and/or based on a comparison of the measured reflected signal power to a third threshold.

8. The communication method of claim 6 further comprising:
   transmitting, from the transmitter, a known signal;
   receiving, at the receiver, a second feedback signal comprising part of a signal energy of the transmitted known signal; and generating the alert signal if the second feedback signal and the known signal do not match according to second designated criteria.

9. The communication method of claim 6 wherein the alert signal that is generated if the first feedback signal does not match the incoming message according to first designated criteria is different than the alert signal that is generated based on the comparison of the signal power to the threshold.

10. A communication apparatus comprising:
an operation module configured to communicate with an off-board wireless message repeater having a transmitter operably coupled to an antenna system and a receiver operably coupled to the antenna system, wherein:
the operation module is configured to generate an alert signal if a message or other information content of a feedback signal does not match a message or other information content of an incoming message received by the message repeater receiver from a vehicle traveling along a route by which the messaue repeater is proximately positioned, the feedback signal comprising part of a signal energy of a transmitted repeat message of the incoming message as transmitted by the transmitter and received by the receiver; and
the operation module is configured to generate the alert signal if a measured forward power associated with the transmitted repeat message is below a first threshold.

11. The communication apparatus of claim 10 further comprising a directional coupler sub-system coupled between the transmitter and antenna system, the directional coupler sub-system configured to measure the forward power by sampling a signal of the transmitted repeat message that passes through the directional coupler sub-system from the transmitter to the antenna system.

12. The communication apparatus of claim 11 further comprising a detector sub-system connected to the directional coupler sub-system, the detector sub-system configured to convert a sampling output of the forward power of the directional coupler sub-system into a format for use by the operation module in comparing the measured forward power to the first threshold.

13. The communication apparatus of claim 10 further comprising an RF circulator coupled between the receiver, the transmitter, and the antenna system for passing the incoming message from the antenna system to the receiver and the repeat message from the transmitter to the antenna system, wherein the feedback signal is generated through an impedance mismatch between a port of the circulator to which the transmitter is connected and a port of the circulator to which the antenna system is connected.

14. The communication apparatus of claim 10 wherein the alert signal that is generated if the message or other information content of the feedback signal does not match the message or other information content of the incoming message is different than the alert signal that is generated if the measured forward power associated with the transmitted repeat message is below the first threshold.

15. A communication apparatus comprising:
an off-board wireless message repeater configured to be positioned proximate to a vehicle route, the message repeater having an antenna system, a transmitter, a power monitoring sub-system, and a receiver, the transmitter and receiver operably coupled to the antenna system, wherein: the receiver is configured to receive a wireless incoming message from a vehicle traveling along the route; responsive to the incoming message that is received, the transmitter is configured to transmit a wireless repeat message of the incoming message to the vehicle; subsequent to the wireless repeat message being transmitted by the transmitter, the receiver is configured to receive a feedback signal comprising part of a signal energy of the wireless repeat message that is transmitted by the transmitter; and the power monitoring sub-system is configured to measure a forward power associated with the repeat message transmitted by the transmitter; and
an operation module configured to communicate with the message repeater, wherein:
the operation module is configured to compare a message or other information content of the feedback signal received by the receiver to a message or other information content of the incoming message received by the receiver;
the operation module is configured to generate an alert signal if the message or other information content of the feedback signal received by the receiver does not match the message or other information content of the incoming message received by the receiver; and
the operation module is configured to generate the alert signal if the measured forward power associated with the transmitted repeat message is below a first threshold.

16. The communication apparatus of claim 15 wherein the power monitoring sub-system comprises a directional coupler sub-system coupled between the transmitter and antenna system, the directional coupler sub-system configured to measure the forward power by sampling a signal of the transmitted repeat message that passes through the directional coupler sub-system from the transmitter to the antenna system.

17. The communication apparatus of claim 16 further comprising a detector sub-system connected to the directional coupler sub-system, the detector sub-system configured to convert a sampling output of the forward power of the directional coupler sub-system into a format for use by the operation module in comparing the measured forward power to the first threshold.

18. The communication apparatus of claim 15 further comprising an RF circulator coupled between the receiver, the transmitter, and the antenna system for passing the incoming message from the antenna system to the receiver and the repeat message from the transmitter to the antenna system, wherein the feedback signal is generated through an impedance mismatch between a port of the circulator to which the transmitter is connected and a port of the circulator to which the antenna system is connected.

19. The communication apparatus of claim 15 wherein the alert signal that is generated if the message or other information content of the feedback signal does not match the message or other information content of the incoming message is different than the alert signal that is generated if the measured forward power associated with the transmitted repeat message is below the first threshold.

* * * * *